United States Patent
Ragupathi et al.

(10) Patent No.: US 9,857,856 B2
(45) Date of Patent: Jan. 2, 2018

(54) SYSTEM AND METHOD FOR DETERMINING POWER SUPPLY UNIT CONFIGURATIONS IN AN INFORMATION HANDLING SYSTEM

(71) Applicant: DELL PRODUCTS, L.P., Round Rock, TX (US)

(72) Inventors: Dinesh Kunnathur Ragupathi, Round Rock, TX (US); Alaric Joaquim Narcissius Silveira, Round Rock, TX (US); Eric Michael Tunks, Austin, TX (US); John Ervin Jenne, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/967,256

(22) Filed: Dec. 11, 2015

(65) Prior Publication Data

US 2017/0168535 A1    Jun. 15, 2017

(51) Int. Cl.
G06F 1/28    (2006.01)

(52) U.S. Cl.
CPC ..................... *G06F 1/28* (2013.01)

(58) Field of Classification Search
CPC ............................. G06F 1/32; G06F 1/3234
USPC ........................................................ 713/320
See application file for complete search history.

(56) References Cited

U.S. PATENT DOCUMENTS

| | | | |
|---|---|---|---|
| 8,390,148 B2 | 3/2013 | Shetty et al. | |
| 8,645,739 B2 | 2/2014 | Berke et al. | |
| 2009/0217060 A1* | 8/2009 | Tsuchiya | G06F 1/3203 713/300 |
| 2010/0100756 A1 | 4/2010 | Rahardjo | |
| 2010/0250973 A1 | 9/2010 | Breen, III et al. | |
| 2011/0191618 A1 | 8/2011 | Berke et al. | |
| 2012/0216055 A1* | 8/2012 | Dumas | G06F 1/26 713/320 |
| 2014/0181544 A1 | 6/2014 | Breen et al. | |
| 2014/0208136 A1* | 7/2014 | Rahardjo | G06F 1/26 713/320 |
| 2015/0100806 A1* | 4/2015 | Munjal | G06F 1/3203 713/320 |
| 2015/0121113 A1* | 4/2015 | Ramamurthy | H02J 9/061 713/340 |
| 2016/0342186 A1* | 11/2016 | Ragupathi | G06F 1/189 |

* cited by examiner

*Primary Examiner* — Vincent Tran
(74) *Attorney, Agent, or Firm* — Isidore PLLC

(57) ABSTRACT

A method determines power supply unit configurations in an information handling system. The method includes determining, via a controller, a first amount of power required to operate functional components of the IHS. A history table is retrieved containing a plurality of power supply unit (PSU) configurations and PSU data. The method further includes determining if the history table contains a first PSU configuration corresponding to the first amount of power. In response to determining that the history table contains the first PSU configuration corresponding to the first amount of power, the PSUs identified as active mode PSUs in the first PSU configuration are triggered to be in an active mode and operating at the corresponding percentage load and the PSUs identified as sleep mode PSUs in the first PSU configuration are triggered to be in a sleep mode.

18 Claims, 12 Drawing Sheets

| % Power Cap 495 | PSU 1 Active, PSU 4 Active 496 | | | PSU 1 Active, PSU 4 Sleep 497 | | | PSU 1 Sleep, PSU 4 Active 498 | | |
|---|---|---|---|---|---|---|---|---|---|
| | PSU 1 | PSU 4 | Total | PSU 1 | PSU 4 | Total | PSU 1 | PSU 4 | Total |
| 100% | Input Power | 196W | 190W | ///386W/// | 387W | 5W | 392W | 4W | 385W | 389W |
| | Output Power | 182W | 177W | 359W | 359W | 0W | 359W | 0W | 359W | 359W |
| | Exhaust Temp | 53C | 52C | | 55C | 51C | | 51C | 55C | |
| 90% | Input Power | 177W | 176W | ///353W/// | 353W | 5W | 358W | 4W | 351W | 355W |
| | Output Power | 164W | 164W | 328W | 328W | 0W | 328W | 0W | 328W | 328W |
| | Exhaust Temp | 53C | 52C | | 55C | 51C | | 51C | 55C | |
| 80% | Input Power | 159W | 159W | 318W | 312W | 5W | 317W | 4W | 310W | ///314W/// |
| | Output Power | 146W | 146W | 291W | 291W | 0W | 291W | 0W | 291W | 291W |
| | Exhaust Temp | 53C | 53C | | 55C | 51C | | 51C | 54C | |
| 70% | Input Power | 140W | 139W | 278W | 273W | 5W | 278W | 4W | 271W | ///275W/// |
| | Output Power | 127W | 127W | 255W | 255W | 0W | 255W | 0W | 255W | 255W |
| | Exhaust Temp | 53C | 53C | | 55C | 51C | | 51C | 54C | |
| 60% | Input Power | 120W | 119W | 239W | 232W | 5W | 237W | 4W | 231W | ///235W/// |
| | Output Power | 109W | 109W | 218W | 218W | 0W | 218W | 0W | 218W | 218W |
| | Exhaust Temp | 53C | 53C | | 54C | 52C | | 51C | 54C | |

| % Power Cap 495 | | PSU 1 Active, PSU 4 Active 496 | | | PSU 1 Active, PSU 4 Sleep 497 | | | PSU 1 Sleep, PSU 4 Active 498 | | |
|---|---|---|---|---|---|---|---|---|---|---|
| | | PSU 1 | PSU 4 | Total | PSU 1 | PSU 4 | Total | PSU 1 | PSU 4 | Total |
| 50% | Input Power | 101W | 101W | 202W | 196W | 5W | 201W | 4W | 195W | 199W |
| | Output Power | 91W | 91W | 182W | 182W | 0W | 182W | 0W | 182W | 182W |
| | Exhaust Temp | 54C | 53C | | 55C | 52C | | 51C | 55C | |
| 40% | Input Power | 81W | 80W | ▓▓▓ | 159W | 5W | 164W | 4W | 159W | 163W |
| | Output Power | 73W | 73W | 146W | 146W | 0W | 146W | 0W | 146W | 146W |
| | Exhaust Temp | 54C | 53C | | 56C | 52C | | 52C | 56C | |
| 30% | Input Power | 61W | 60W | ▓▓▓ | 120W | 5W | 125W | 4W | 119W | 123W |
| | Output Power | 55W | 55W | 109W | 109W | 0W | 109W | 0W | 109W | 109W |
| | Exhaust Temp | 54C | 53C | | 56C | 53C | | 52C | 56C | |
| 20% | Input Power | 44W | 44W | 89W | 81W | 5W | 86W | 4W | 80W | ▓▓▓ |
| | Output Power | 36W | 36W | 73W | 73W | 0W | 73W | 0W | 73W | 73W |
| | Exhaust Temp | 57C | 57C | | 57C | 55C | | 54C | 57C | |
| 10% | Input Power | 22W | 22W | ▓▓▓ | 44W | 5W | 49W | 4W | 44W | 48W |
| | Output Power | 18W | 18W | 36W | 36W | 0W | 36W | 0W | 36W | 36W |
| | Exhaust Temp | 57C | 57C | | 64C | 59C | | 57C | 64C | | ns in an IHS.

SYSTEM AND METHOD FOR DETERMINING POWER SUPPLY UNIT CONFIGURATIONS IN AN INFORMATION HANDLING SYSTEM

BACKGROUND

1. Technical Field

The present disclosure generally relates to information handling systems and in particular to a system and method for determining power supply unit configurations in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of redundant alternating current to direct current (AC-DC) or direct current to direct current (DC-DC) power supplies that provide regulated voltages to different loads. The load current may vary across a broad range from relatively high peak currents to very low stable currents. The AC-DC and DC-DC power supplies used in servers typically should be designed for a large range of server configurations and generally need to be designed to handle the full load of the server safely. The power supplies also need to be optimized for efficiency, size, and cost.

In many applications, reliability or availability of the information handling system is an important factor. Redundant power supplies provide an equivalent power back up when one or more power supplies discontinue operation. Multiple power supplies provide redundancy by being coupled to a common output bus. Wherever more than one power supply exists, the power supplies can be designated to be in various states or modes such as active, sleep, hot-spare or cold spare. Typically the selection of which power supplies are active and which power supplies are in a sleep mode are pre-determined by a user during configuration of the system. If one power supply fails, one of the redundant power supplies can be brought online to replace the failed power supply.

BRIEF SUMMARY

Disclosed are a method, a power supply system, and an information handling system (IHS) for determining power supply unit (PSU) configurations in an IHS.

As one aspect of the disclosure, a history table is generated by triggering the PSUs to be in a plurality of combinations of active and sleep modes and triggering the PSUs to transmit PSU parameters associated with operation of the PSU at each of the plurality of percentage loads and for each of the plurality of combinations. The PSU parameters for the plurality of percentage loads for each of the plurality of combinations are stored as the plurality of PSU configurations.

According to one embodiment, the method comprises determining, via a controller, a first amount of power required to operate functional components of the IHS. The first amount of power correlates to a present percentage load on a plurality of PSUs utilized to power the IHS. The history table containing a plurality of power supply unit (PSU) configurations and PSU data is retrieved. The PSU configurations include combinations of active mode and sleep mode PSUs for each of a plurality of percentage loads. The method further includes determining if the history table contains a first PSU configuration corresponding to the first amount of power required to operate functional components of the IHS. In response to determining that the history table contains the first PSU configuration, the PSUs identified as active mode PSUs in the first PSU configuration are triggered to be in an active mode and to collectively operate at the corresponding percentage load, and the PSUs identified as sleep mode PSUs in the first PSU configuration are configured to be in a sleep mode.

According to another embodiment, a power supply system comprises a plurality of PSUs supplying power to an IHS. A controller is communicatively coupled to the PSUs. The controller has firmware executing thereon to determine at least one PSU configuration to apply to the IHS. The firmware configures the controller to determine a first amount of power required to operate functional components of the IHS. The first amount of power correlates to a present percentage load on the plurality of PSUs utilized to power the IHS. The history table containing a plurality of PSU configurations and PSU data is retrieved. The controller determines if the history table contains a first PSU configuration corresponding to the first amount of power required to operate functional components of the IHS. In response to determining that the history table contains the first PSU configuration, the controller triggers the PSUs identified as active mode PSUs in the first PSU configuration to be in an active mode and collectively operating at the corresponding percentage load. The PSUs identified as sleep mode PSUs in the first PSU configuration are triggered to be in a sleep mode.

Also disclosed is an IHS that comprises a processor and a plurality of PSUs that are configurable in one of multiple different power configurations to supply power to the IHS. A controller is communicatively coupled to the plurality of PSUs. The controller has firmware executing thereon to determine at least one PSU configuration. The firmware configures the controller to determine a first amount of power required to operate functional components of the IHS. The first amount of power correlates to a present percentage load on the plurality of PSUs utilized to power the IHS. The history table containing a plurality of PSU configurations and PSU data is retrieved. The controller determines if the history table contains a first PSU configuration corresponding to the first amount of power required to operate functional components of the IHS. In response to determining that the history table contains the first PSU configuration, the PSUs identified as active mode PSUs in the first PSU configuration are triggered by the controller to be in an active mode and collectively operating at the corresponding percentage load. The PSUs identified as sleep mode PSUs in the first PSU configuration are triggered to be in a sleep mode.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 4B and 4C are block diagrams illustrating an example history table, in accordance with one embodiment;

DETAILED DESCRIPTION

The illustrative embodiments provide a method, a power supply system, and an information handling system (IHS) for determining PSU configurations in an IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
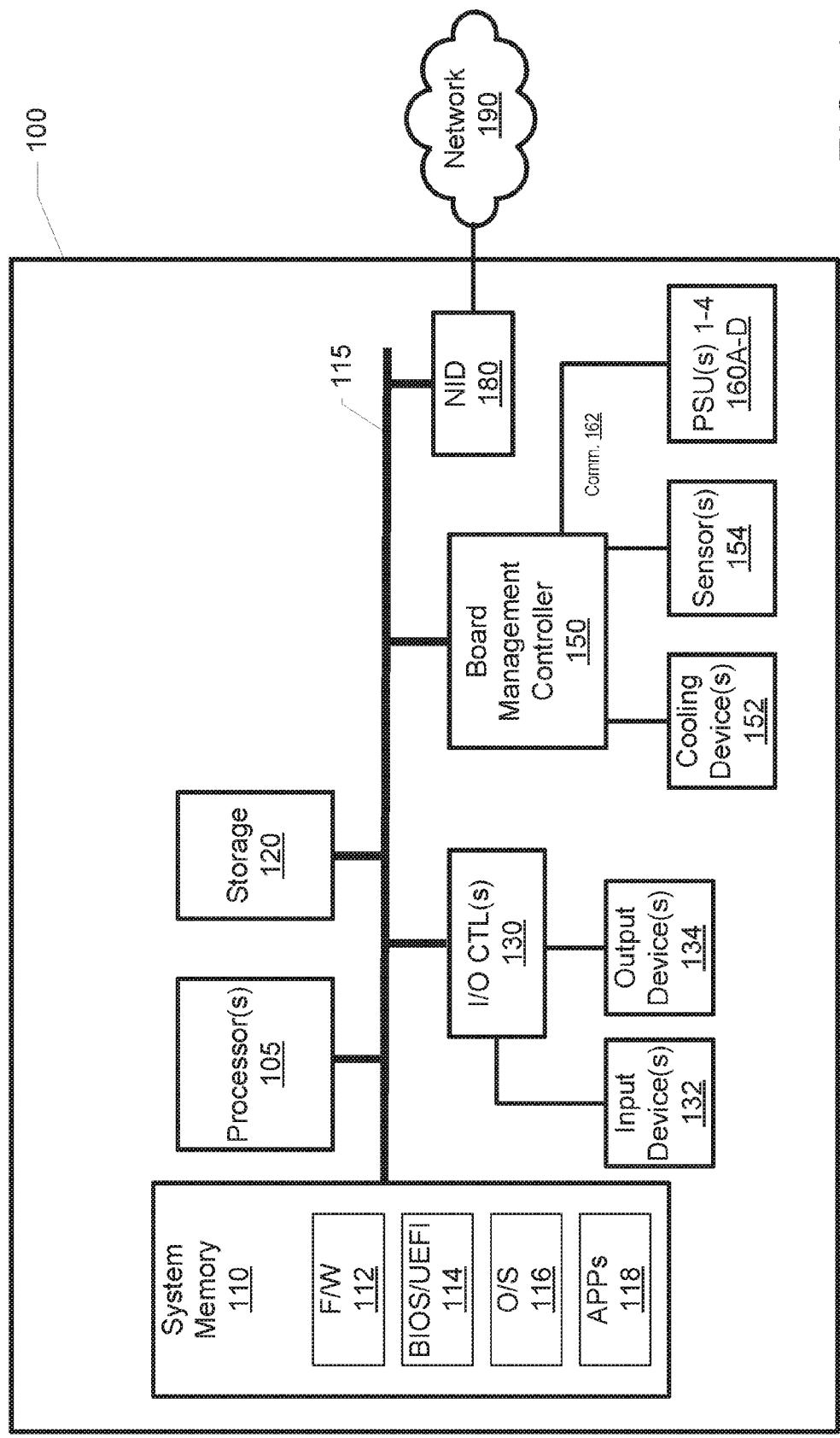
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and is thus illustrated as and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

Additionally, in one or more embodiments, IHS 100 includes a board management controller (BMC) 150, one or more cooling devices (CD) 152 and one or more sensors 154. BMC 150 is in communication with processor(s) 105 and system memory 110 via system interconnect 115. BMC 150 contains components that control specific operations of IHS 100 such as power and thermal management. BMC 150 is in communication with CDs 152 and sensors 154. CDs 152 can be one or more air movers, such as fans, that are positioned to cool IHS 100 during operation of IHS 100. Sensors 154 can include various types of sensors such as temperature sensors, pressure sensors and flow sensors. Sensors 154 provide an electrical signal to BMC 150 that is indicative of or proportional to the quantity being read, measured or sensed by the sensor.

IHS 100 further includes power supply units (PSUs) 1-4 160A-D. PSUs 160A-D provide a regulated source of power to IHS 100. PSUs 160A-D are communicatively coupled to BMC 150 by a communication bus 162. PSUs 160A-D supply power to each of the components within IHS 100 that require power via either one or more bus bars or power cables. BMC 150 can receive power supply data, parameters and settings from PSUs 160A-D via communication bus 162. In one embodiment, several CDs 152, sensors 154 and PSUs 160A-D can be mounted in IHS 100. The PSUs 160A-D are controlled via BMC 150 such that BMC 150 provides redundant power supplies to IHS 100.

IHS 100 further comprises a network interface device (NID) 180. NID 180 enables IHS 100 to communicate and/or interface with other devices, services, and components that are located external to IHS 100. These devices, services, and components can interface with IHS 100 via an external network, such as example network 190, using one or more communication protocols. Network 190 can be a local area network, wide area network, personal area network, and the like, and the connection to and/or between network and IHS 100 can be wired or wireless or a combination thereof. For purposes of discussion, network 190 is indicated as a single collective component for simplicity. However, it is appreciated that network 190 can comprise one or more direct connections to other devices as well as a more complex set of interconnections as can exist within a wide area network, such as the Internet.

Figure 2A:
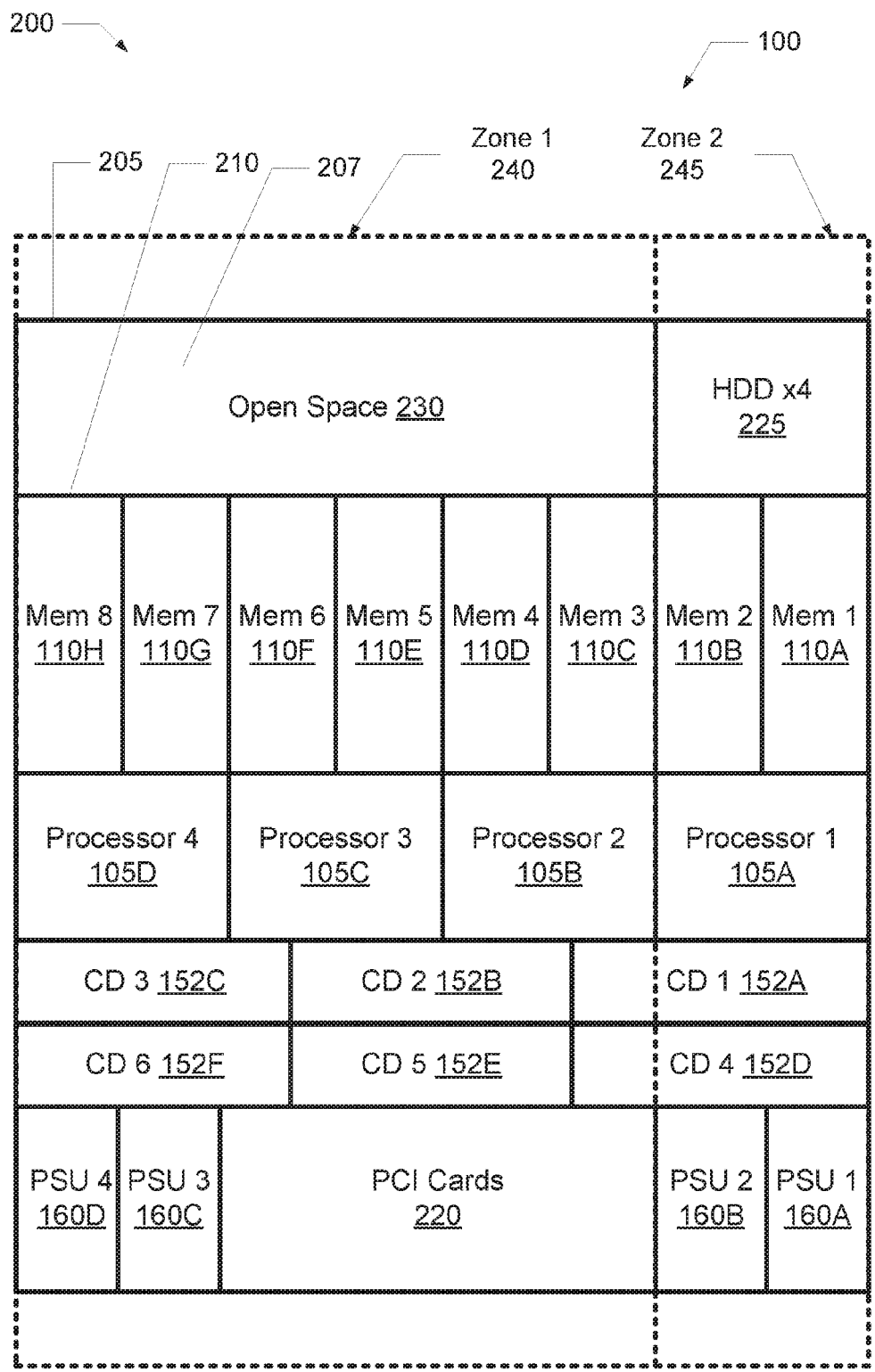
FIG. 2A is a block diagram illustrating a physical layout of components and temperature zones within the example information handling system, in accordance with one embodiment.

With reference now to FIG. 2A, there is illustrated one embodiment of a physical layout 200 of components and zones within IHS 100. IHS 100 includes a rack chassis or housing 205 that contains the components of IHS 100. In one embodiment, housing 205 can contain a single IHS. In another embodiment, housing 205 can be representative of a server rack that holds several IHSs. Housing 205 can have an interior cavity 207 that can be divided into several compartments 210 and an open space 230. The temperature within housing 205 and compartments 210 can vary depending upon the location of the components, the airflow provided by the CDs, and the amount of power being drawn by components of IHS 100.

Four hard disk drives (HDD) 225 are located at the top of housing 205. Memory cards 1-8 110A-H are mounted below open space 230 and (HDD) 225. Processors 1-4 105A-D are mounted in housing 205 below memory cards 1-8 110A-H. CDs 1-6 152A-F are mounted in housing 205 below processors 1-4 105A-D. One or more peripheral component interface (PCI) devices 220 and PSUs 1-4 160A-D are mounted at the bottom of housing 205. PSUs 1-2 160A-B are mounted on a right side of housing 205 and PSUs 3-4 160C-D are mounted on the left side of housing 205. Because of the open space 230 and fewer HDDs 225 in the airflow path, the left side zone 1 240 of interior cavity 207 will have a lower airflow impedance (higher airflow rate) than the right side zone 2 245 of interior cavity 207. For example, in one empirical measurement study of physical layout 200, PSUs 1-2 160A-B each had a steady state operating temperature of 40 degrees Centigrade and PSUs 3-4 160C-D each had a steady state operating temperature of 37 degrees Centigrade.

Figure 2B:
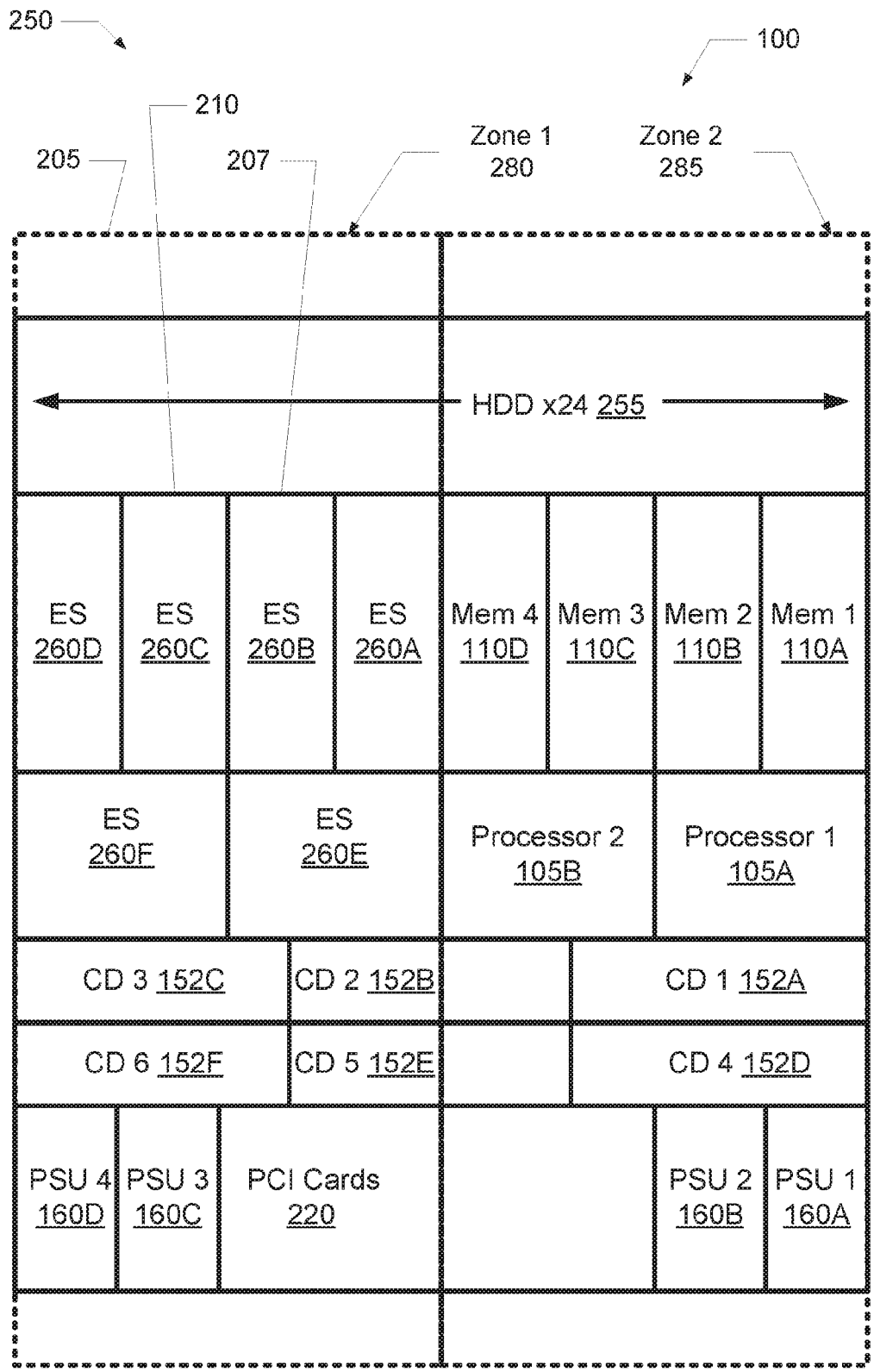
FIG. 2B is a block diagram illustrating a physical layout of components and temperature zones within the example information handling system, in accordance with another embodiment.

FIG. 2B illustrates another embodiment of a physical layout 250 of components and zones within IHS 100. IHS 100 includes a rack chassis or housing 205 that contains the components of IHS 100. In one embodiment, housing 205 can contain a single IHS. In another embodiment, housing 205 can be representative of a server rack that holds several IHSs. Housing 205 can have an interior cavity 207 that can be divided into several compartments 210. The temperature within housing 205 and compartments 210 can vary depending upon the location of the components, the airflow of the CDs, and the amount of power being drawn by components of IHS 100.

Twenty-four hard disk drives (HDD) 255 are located at the top of housing 205. Memory cards 1-4 110A-D and empty slots (ES) 260A-D are located below HDDs 255. Memory cards 1-4 110A-D are located on the right side of housing 205. Processors 1-2 105A-B are mounted in the right side of housing 205 below memory cards 1-4 110A-D. ES 260 E and F are located below ES 260A-D. CDs 1-6 152A-F are mounted in housing 205 below processors 1-2 105A-B and below ES 260 E and F. One or more PCI devices 220 and PSUs 1-4 160A-D are mounted at the bottom of housing 205. PSUs 1-2 160A-B are mounted on a right side of housing 205 and PSUs 3-4 160C-D are mounted on the left side of housing 205. Because of ES 260A-F in the airflow path, the left side zone 1 280 of interior cavity 207 will have a lower airflow impedance (higher airflow rate) than the right side zone 2 285 of interior cavity 207. For example, in one empirical measurement study of physical layout 250, PSUs 1-2 160A-B each had a steady state operating temperature of 40 degrees Centigrade and PSUs 3-4 160C-D each had a steady state operating temperature of 32 degrees Centigrade.

PSUs 1-4 160A-D are geographically separated within housing 205. Because of the separation of the PSU, each PSU can experience different operating conditions and temperatures. The airflow path to the PSUs is changeable due to the configuration of IHS 100, and specifically the components that are in the airflow path. The heat generated by the components is variable due to the changing workload of the system components.

Figure 3:
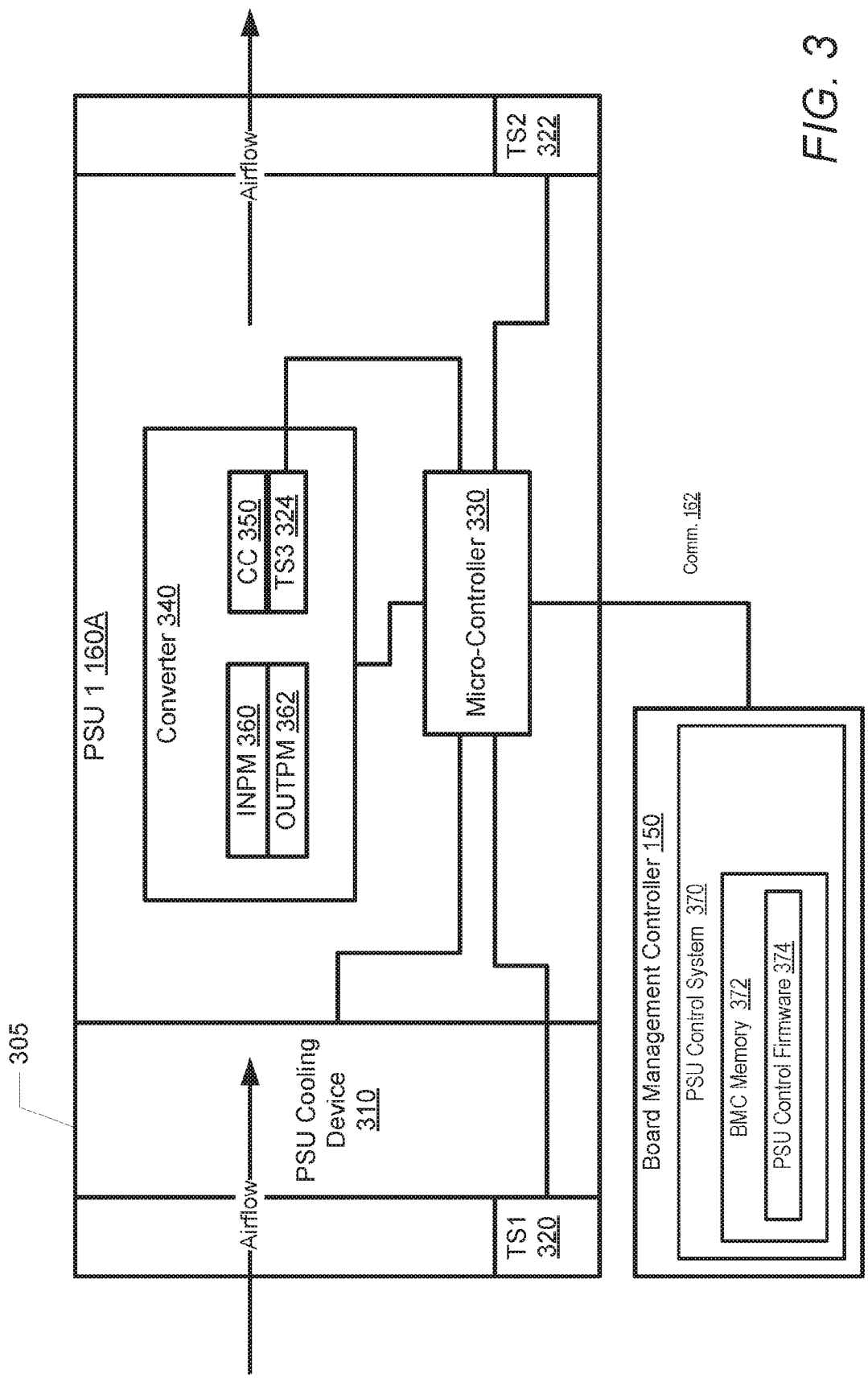
FIG. 3 is a block diagram of an example PSU, in accordance with one embodiment.

FIG. 3 illustrates additional details of the PSUs and specifically PSU 1 160A. PSU 1 160A comprises a housing 305, a PSU cooling device 310, temperature sensors (TS) 320, 322, micro-controller 330 and converter 340. Converter 340 is communicatively coupled to micro-controller 330. Converter 340 can supply a controlled voltage and current to IHS 100. Converter 340 includes an input power meter (INPM) 360, an output power meter (OUTPM) 362, one or more critical components (CC) 350 and a critical component temperature sensor (TS3) 324. INPM 360 can measure the amount of input power drawn or used by PSU 1 160A. OUTPM 362 can measure the amount of output power produced by PSU 1 160A. CC 350 is one or more components within PSU 1 160A. For example in one embodiment, CC 350 can be the output switches or field effect transistors of the converter.

TS3 324 is a temperature sensor that is located in proximity to CC 350 and can monitor the temperature of CC 350. TS3 324 produces a voltage that is proportional to the temperature sensed by the temperature sensor. TS3 324 can be one of various types of temperature sensors such as a thermistor, a thermocouple, a resistance thermometer or a silicon bandgap temperature sensor.

PSU 1 160A further includes a PSU cooling device 310, such as a fan mounted toward an air inlet side of PSU 1 160A. PSU cooling device 310 is coupled to micro-controller 330 such that micro-controller 330 can control the fan speed of PSU cooling device 310. PSU 1 160A also includes an inlet air TS, TS1 320, and an exhaust air TS, TS2 322. TS1 320 can sense the air temperature of air coming into PSU 1 160A and TS2 322 can sense the air temperature of air being exhausted from PSU 1 160A.

Each of PSU cooling device 310, temperature sensors (TS) 320, 322, and 324 and converter 340 communicates with BMC 150 via micro-controller 330 and communication bus 162. Micro-controller 330 is communicatively coupled to BMC 150 via communication bus 162. BMC 150 contains one or more input/output controllers that support connection to and processing of signals from micro-controller 330. BMC 150 can receive power supply data, parameters and settings from micro-controller 330 via communication bus 162. BMC 150 utilizes the data and parameters received from micro-controller 330 to control PSU 1 160A.

BMC 150 can include a PSU control system 370 that controls the operation of PSUs 1-4 160A-D. PSU control system 370 includes BMC memory 372. In one embodiment, BMC memory 372 can be a non-volatile or flash memory device. BMC memory 372 stores PSU control firmware 374. By executing PSU control firmware 374, BMC 150 can determine configurations of PSUs 160A-D such that certain PSUs are in an active mode and others in a sleep mode, based on the thermal operating efficiency of the PSUs.

Those of ordinary skill in the art will appreciate that the hardware components and basic configurations depicted in FIGS. 1-3 and described herein may vary. For example, the illustrative components within IHS 100 (FIG. 1), housing 205 (FIG. 2) and PSU 1 160A (FIG. 3) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 4A:
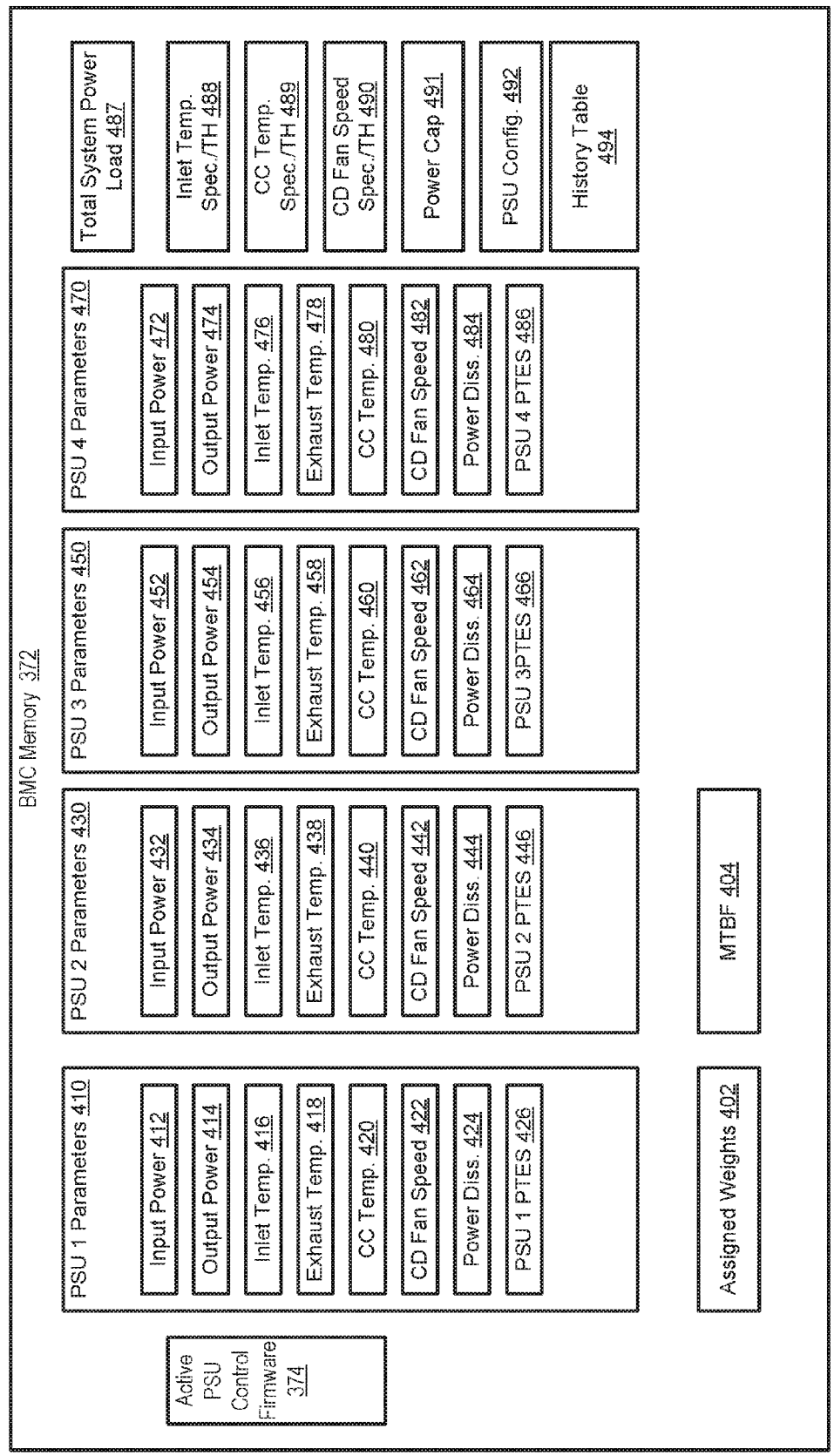
FIG. 4A is a block diagram illustrating example contents of the memory of the PSU control system, in accordance with one embodiment.

With reference now to FIG. 4A, one embodiment of example contents of BMC memory 372 are shown. In the description of FIG. 4A, reference is also made to specific components illustrated within the preceding FIGS. 1-3. BMC memory 372 stores PSU control firmware 374. PSU control firmware 374 controls which of the PSUs 160A-D are in an active mode and which of the PSUs 160A-D are in a sleep mode in IHS 100.

BMC memory 372 stores assigned weights 402 and mean time between failures (MTBF) 404. Assigned weights 402 are pre-determined percentage values used in several calculated values for the PSUs. MTBFs 404 are the predicted elapsed time between inherent failures for each of the PSUs in IHS 100. BMC memory 372 also stores PSU 1 parameters 410, PSU 2 parameters 430, PSU 3 parameters 450 and PSU 4 parameters 470. PSU 1 parameters 410 include input power 412 for various PSU loads as measured by INPM 360, output power 414 for various PSU loads measured by OUTPM 362, inlet air temperature 416 for various PSU loads measured by TS1 320, exhaust air temperature 418 for various PSU loads measured by TS2 322, and critical component temperature 420 for various PSU loads measured by TS3 324. PSU 1 parameters 410 further include cooling device fan speeds for various PSU loads 422, power dissipation 424 for various PSU loads and PSU 1 thermal efficiency score (PTES) 426 for various PSU loads. Power dissipation 424 is the amount of power that is consumed internally by PSU1 160A. PTES 426 is a calculated value that is calculated from PSU 1 parameters 410.

For example, input power 412, output power 414, inlet air temperature 416, exhaust air temperature 418, critical component temperature 420, and cooling device fan speeds 422 for various PSU loads can be measured, recorded and stored to BMC memory 372. In one embodiment, the PSU 1 parameters 410 can be measured at total PSU loads of 100%, 90%, 80%, 70%, 60%, 50%, 40%, 30%, 20% and 10%.

PSU 2 parameters 430 include input power 432, output power 434, inlet air temperature 436, exhaust air temperature 438 and critical component temperature 440, cooling device fan speed 442, power dissipation 444 and PTES 446. PSU 3 parameters 450 include input power 452, output power 454, inlet air temperature 456, exhaust air temperature 458 and critical component temperature 460, cooling device fan speed 462, power dissipation 464 and PTES 466. PSU 4 parameters 470 include input power 472, output power 474, inlet air temperature 476, exhaust air temperature 478 and critical component temperature 480, cooling device fan speed 482, power dissipation 484 and PTES 486.

As further illustrated, BMC memory 372 further stores total system power load 487, inlet air temperature threshold 488, critical component temperature threshold 489, cooling device fan speed threshold 490, power cap 491, PSU configuration 492 and history table 494. Total system power load 487 is the current amount of power required to operate processing components and other functional components of IHS 100. Inlet air temperature threshold 488, critical component temperature threshold 489, and cooling device fan speed threshold 490 are used to calculate the PTES scores. Power cap 491 is the total PSU output power load, and PSU configuration 492 is a list of the configuration of PSUs 160A-D required by IHS 100. For example, PSU configuration 492 can designate that at least one of PSUs 160A-D are to be a hot spare PSU. History table 494 can contain PSU parameters 410, 430, 450 and 470 that are received by BMC 150 and then stored to BMC memory 372.

Turning to FIGS. 4B and 4C, an example history table 494 for PSU 1 160A and PSU 4 160D is shown. History table 494 is shown containing a portion of power supply parameters 410 and 470 for combinations of PSU 1 160A and PSU 4 160D at various system power loads 495 that are percentages of the power cap. The combinations of PSU 1 160A and PSU 4 160D include PSU 1 and 4 both active 496, PSU 1 active and PSU 4 in sleep mode 497 and PSU 1 in sleep mode and PSU 4 active 498.

The cells in history table 494 can contain, for PSU 1, the input power 412, output power 414, and exhaust air temperature 418. The cells in history table 494 can contain, for PSU 4, the input power 472, output power 474, and exhaust air temperature 478. For example, at a system power load of 100% and both PSU 1 and PSU 4 active, the PSU 1 input power 412 can be 196 watts, the output power 414 can be 182 watts, and the exhaust air temperature 418 can be 53 degrees C. The PSU 4 input power 472 can be 190 watts, output power 474 can be 177 watts, and the exhaust air temperature 478 can be 52 degrees C. As shown in FIG. 4B, at a system load of 100%, the most power efficient combination of PSUs is for both PSU 1 and PSU 4 to be active with a total input power consumption of 386 watts. The most power efficient combinations of the PSUs at each percentage system load is shown with cross-hatching in FIGS. 4B and 4C. In an embodiment, history table 494 can be generated by BMC 150 during start-up operations of IHS 100. In one embodiment, history table 494 can be generated by BMC 150 during a power on self test (POST) performed by IHS 100.

FIGS. 5, 6A-6B and 7A-7B illustrate flowcharts of exemplary methods by which PSU control system 370 and BMC 150 within the preceding figures performs different aspects of the processes that enable the one or more embodiments of the disclosure. Generally, method 500 represents a computer-implemented method to determine active and sleep mode PSUs based on PTES scores. Method 600 represents a computer-implemented method to determine active and sleep mode PSUs on a one time basis during start-up of IHS 100. Method 700 represents a computer-implemented method to determine active and sleep mode PSUs on a real time basis.

The description of each method is provided with general reference to the specific components illustrated within the preceding FIGS. 1-4C. Generally, each method is described as being implemented via the execution of code provided by PSU control firmware 374 acting within BMC 150 of IHS 100. It is however appreciated that certain aspects of the described methods may be implemented via other processing devices and/or execution of other code.

Figure 5:
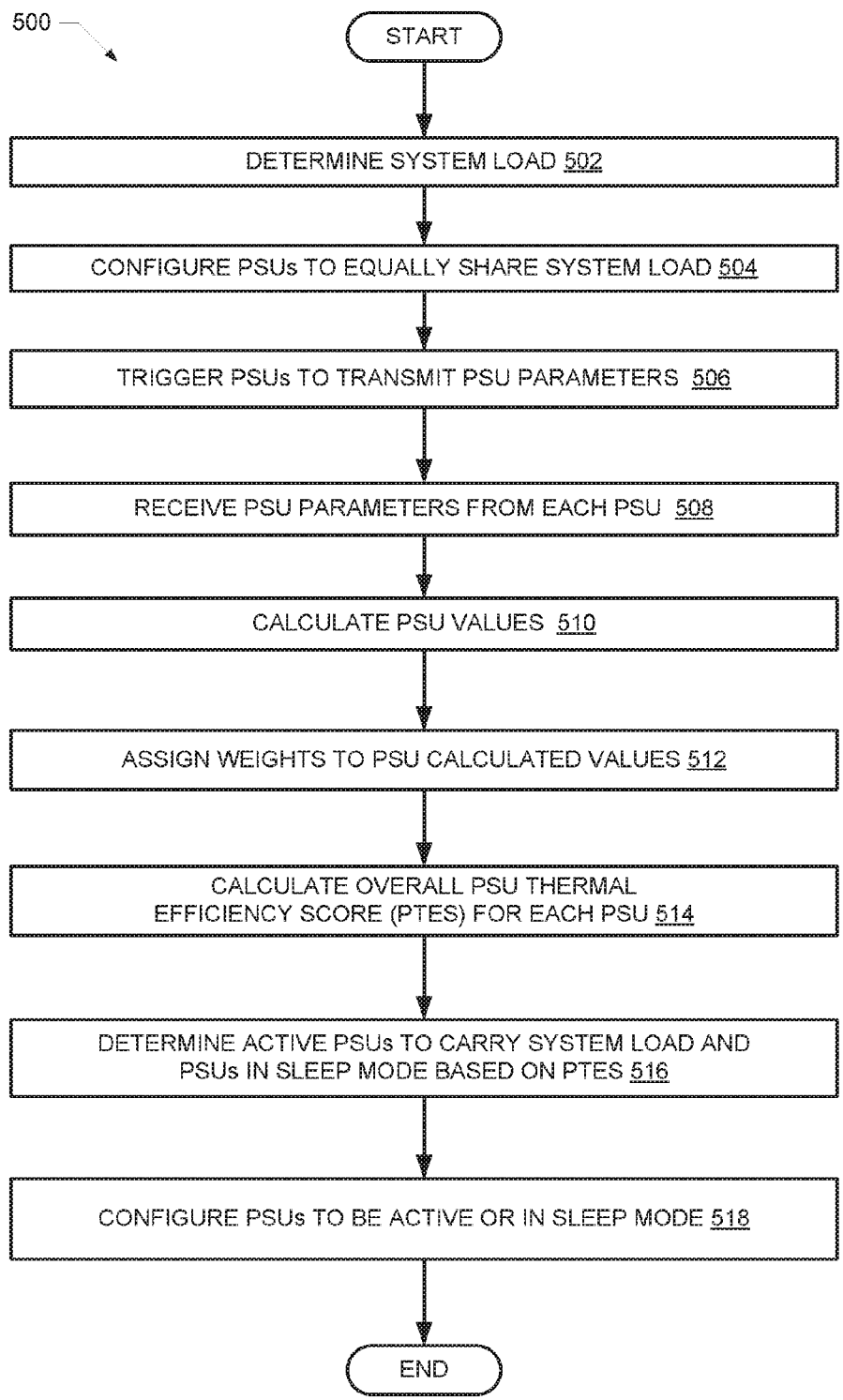
FIG. 5 is a flow chart illustrating one example of a method for determining active and sleep mode PSUs in an information handling system, according to one or more embodiments.

With specific reference to FIG. 5, method 500 begins at the start block and proceeds to block 502 where BMC 150 determines the total system power load 487 for IHS 100. At block 504, BMC 150 configures each of the PSUs 160A-D to equally share the total system power load 487. BMC 150 triggers each of the PSUs 160A-D to transmit their respective PSU parameters 410, 430, 450 and 470 (block 506) and BMC 150 receives the PSU parameters 410, 430, 450 and 470 (block 508).

At block 510, BMC 150 calculates several PSU statistics for each of PSUs 160A-D according to equations (1)-(5).

$$\text{PSU inlet temperature margin} = \text{PSU inlet temperature specification 488} - \text{actual PSU inlet air temperature (i.e. inlet air temperature 416 for PSU 1).} \quad (1)$$

$$\text{PSU critical component temperature margin} = \text{PSU critical component temperature specification 489} - \text{actual critical component temperature (i.e. CC temperature 420 for PSU 1).} \quad (2)$$

$$\text{PSU airflow} = 1.76 \times [\text{PSU power dissipation (i.e. power diss. 424 for PSU 1)}] / [\text{PSU exhaust temperature (i.e. exhaust temp. 418 for PSU 1)} - \text{PSU inlet temperature (i.e. inlet temp. 416 for PSU 1)}]. \text{ The constant 1.76 applies when airflow is measured or provided in cubic feet per minute, power is measured or provided in watts and temperature is measured or provided in degrees Celsius.} \quad (3)$$

$$\text{Percent maximum fan speed} = \text{cooling device fan speed (i.e. CD fan speed 422 for PSU 1)} / \text{maximum cooling device fan speed 490} \times 100. \quad (4)$$

$$\text{Airflow efficiency quotient} = \text{PSU airflow/percent maximum fan speed.} \quad (5)$$

At block 512, BMC 150 assigns a weight to each of the statistics calculated in equations (1)-(5) based on pre-determined assigned weights 402 stored in BMC memory 372. The assigned weights 402 are pre-determined by a user based on the relative importance of each statistic. For example the PSU inlet temperature margin can be assigned a weight of 50% and the PSU critical component temperature margin can be assigned a weight of 20%.

BMC 150 calculates the PTES values 426, 446, 466 and 486 according to equation (6) at block 514.

$$\text{PTES} = (\text{PSU inlet temp. margin}) \times (0.5) + (\text{PSU critical component temp. margin}) \times (0.2) + (\text{Airflow efficiency quotient}) \times (0.3). \quad (6)$$

BMC 150 determines which PSUs have the highest PTES values and assigns the PSUs with the highest PSUs scores that have sufficient capacity to handle the total system power load 487 to be active PSUs in an active mode, and BMC 150 assigns the remaining PSUs to be in a sleep mode (block 516). BMC 150 configures the respective active PSUs to be in an active mode and configures the respective sleep PSUs to be in a sleep mode (block 518). Method 500 then ends.

Figure 6A:
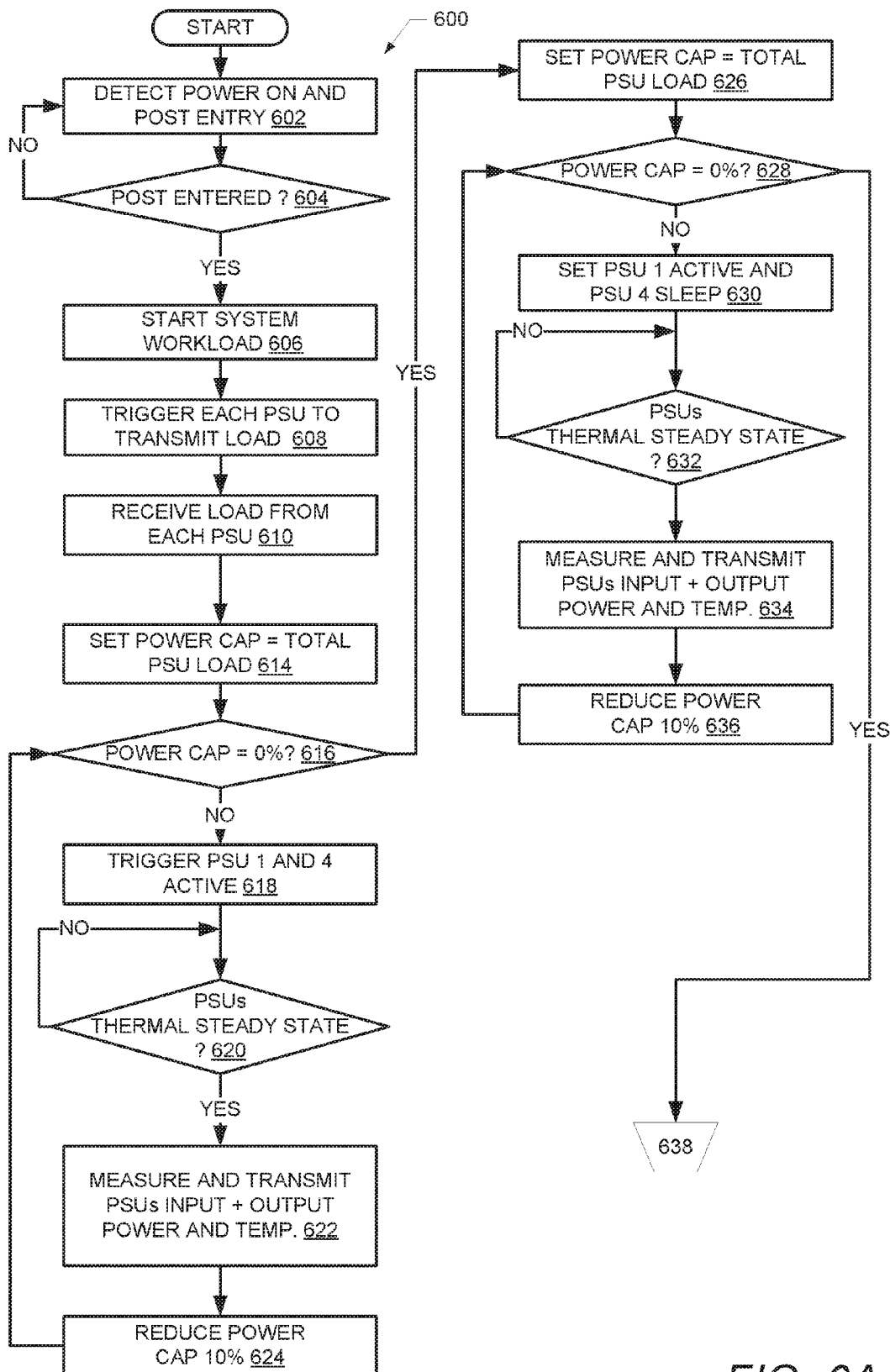
FIGS. 6A and 6B is a flow chart illustrating an example of a method for pre-populating a history table during a POST operation of an information handling system, according to one or more embodiments.
Figure 6B:
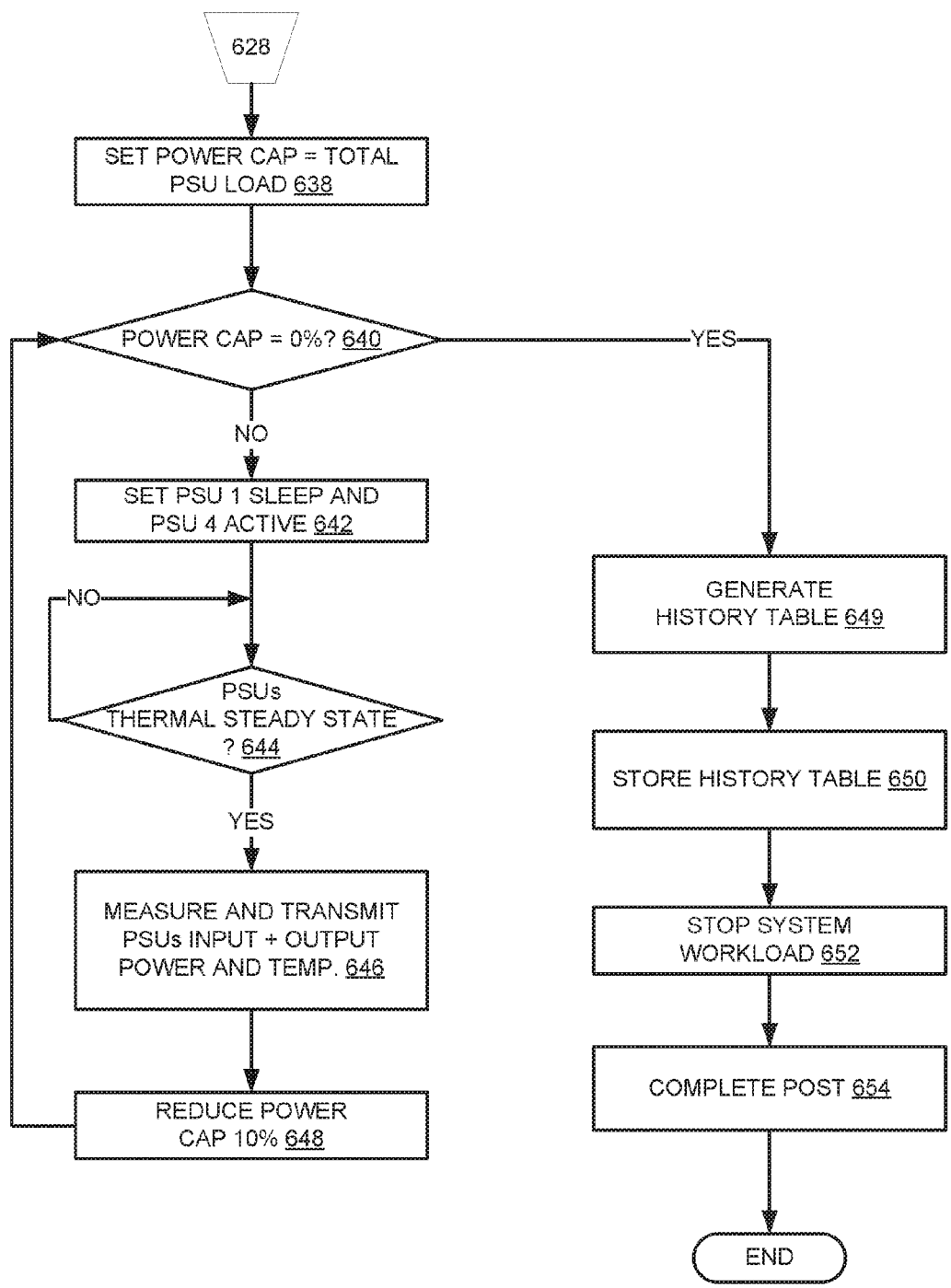

FIGS. 6A-6B illustrate details of method 600, which pre-populates history table 494 during the POST operation of IHS 100 to minimize the re-characterization of the history table at run time. For simplicity in describing the innovative features, method 600 is presented as being implemented within an example IHS (which is referred to as IHS 100') having only two PSUs, PSUs 160A and 160D, which operate under different temperatures. However, it is appreciated that method 600 would be implemented within IHS 100, using all four PSUs, i.e., PSUs 160A-D. Method 600 is applicable to all embodiments in which there are more than two PSUs, and can be applied to an IHS having a much larger number of PSUs. Method 600 begins at the start block and proceeds to block 602 where BMC 150 detects if IHS 100' has powered on and entered POST. At decision block 604, BMC 150 determines if IHS 100' has entered POST. In response to IHS 100' not entering POST, BMC 150 continues to detect if IHS 100' has powered on and entered POST at block 602.

In response to IHS 100' entering POST, BMC 150 triggers IHS 100' to start a normal system workload which corresponds to production of a specific amount of power by PSUs 160A and D to support the operation of processing components and other functional components within IHS 100' (block 606). BMC 150 triggers PSUs 160A and D to transmit each of their output power loads or levels 414 and 474, respectively, to BMC 150 (block 608). BMC 150 receives the output power loads or levels 414 and 474 (block 610) and sets power cap 491 equal to the sum of the total output power loads 414 and 474 (block 614).

At decision block 616, BMC 150 determines if the power cap 491 is equal to 0% of the total output power load. In response to the power cap 491 not being equal to 0% of the total output power load, BMC 150 configures both of PSUs 160A and D to be active and in an "on" state supplying power to IHS 100' (block 618). BMC 150 determines if the PSUs 160A and D have reached a thermal steady state (decision block 620). In response to the PSUs 160A and D not being in thermal steady state, BMC 150 continues to determine if the PSUs 160A and D have reached a thermal steady state at decision block 620. In response to the PSUs 160A and D being in a thermal steady state, BMC 150 triggers PSUs 160A and D to measure and transmit to BMC 150 each of the PSU's respective input power 412 and 472, output power 414 and 474, and temperatures from TS 1, 2, and 3 416, 418, 420 and 476, 478 and 480 (block 622).

BMC 150 reduces the power cap by 10% (block 624) and returns to decision block 616 to continue checking if the power cap 491 is equal to 0% of the total output power load. In response to the power cap 491 not being equal to 0% of the total output power load, BMC 150 repeats blocks 618 to 624 until the power cap 491 is equal to 0% of the total output power load. In response to the power cap 491 being equal to 0% of the total output power load, BMC 150 sets power cap 491 equal to the sum of the total output power loads 414 and 474 (block 626). At decision block 628, BMC 150 determines if the power cap 491 is equal to 0% of the total output power load. In response to the power cap 491 not being equal to 0% of the total output power load, BMC 150 configures PSU 160A to be active and in an "on" state or mode and configures PSU 2 160D to be in a sleep mode (block 630). BMC 150 determines if the PSUs 160A and D have reached a thermal steady state (decision block 632). In response to the PSUs 160A and D not being in thermal steady state, BMC 150 continues to determine if the PSUs 160A and D have reached a thermal steady state at decision block 632.

In response to the PSUs 160A and D being in a thermal steady state, BMC 150 triggers PSUs 160A and D to measure and transmit each of their respective input power 412 and 472, output power 414 and 474, and temperatures 416, 418, 420 and 476, 478 and 480 to BMC 150 (block 634). BMC 150 reduces the power cap by 10% (block 636) and returns to decision block 628 to continue checking if the power cap 491 is equal to 0% of the total output power load. In response to the power cap 491 not being equal to 0% of the total output power load, BMC 150 repeats blocks 630 to 636 until the power cap 491 is equal to 0% of the total output power load.

In response to the power cap 491 being equal to 0% of the total output power load, BMC 150 sets power cap 491 equal to the sum of the total output power loads 414 and 474 (block 638). At decision block 640, BMC 150 determines if the power cap 491 is equal to 0% of the total output power load. In response to the power cap 491 not being equal to 0% of the total output power load, BMC 150 triggers PSU 160D to be active and in an on state or mode and PSU 160A to be in a sleep mode (block 642). BMC 150 determines if the PSUs 160A and D have reached a thermal steady state (decision block 644). In response to the PSUs 160A and D not being in thermal steady state, BMC 150 continues to determine if the PSUs 160A and D have reached a thermal steady state at decision block 644.

In response to the PSUs 160A and D being in a thermal steady state, BMC 150 triggers PSUs 160A and D to measure and transmit each of their respective input power 412 and 472, output power 414 and 474, and temperatures 416, 418, 420, and 476, 478 and 480 to BMC 150 (block 646). BMC 150 reduces the power cap by 10% (block 648) and returns to decision block 640 to continue checking if the power cap 491 is equal to 0% of the total output power load. In response to the power cap 491 not being equal to 0% of the total output power load, BMC 150 repeats blocks 642 to 648 until the power cap 491 is equal to 0% of the total output power load.

In response to the power cap 491 being equal to 0% of the total output power load, BMC 150 generates history table 494 based on the received input powers, output powers, and temperatures for each power cap level 491 (block 649). BMC 150 stores the history table 494 to BMC memory 372 (block 650). BMC 150 stops the system workload (block 652) and allows the POST to finish operation (block 654). Method 600 then ends.

Method 600 generates history table 494 for different load and power values for various combination of active and sleep mode PSUs. Method 600 characterizes the operation of the PSUs for a range of operating conditions on a one-time basis during POST. History table 494 can then be referenced at runtime by IHS 100. The PSU configuration corresponding to the operating conditions that provide optimal performance can be selected for use as will be explained in further detail in FIG. 7.

Figure 7A:
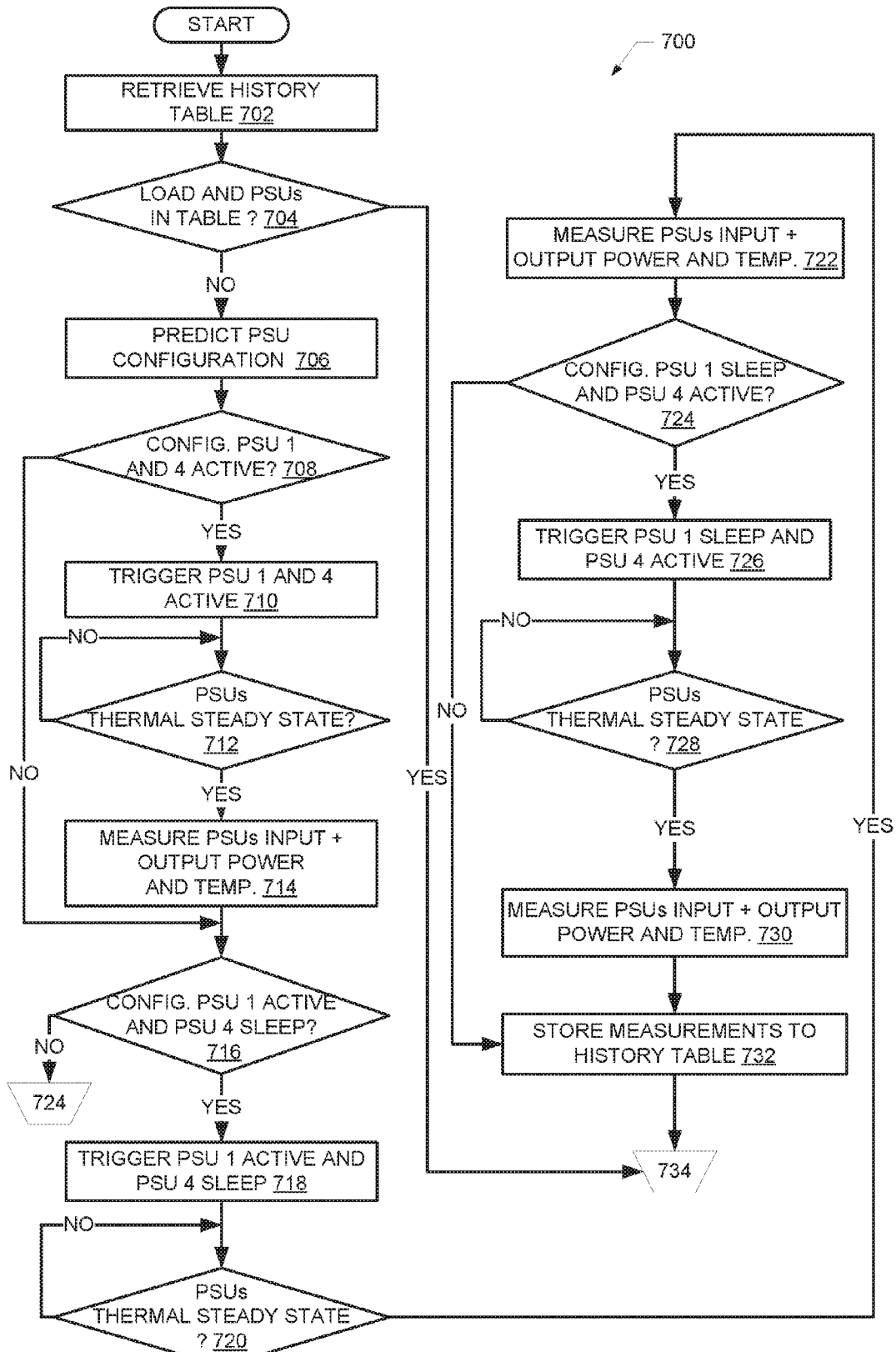
FIGS. 7A and 7B is a flow chart illustrating an additional example of a method for determining active and sleep mode PSUs in an information handling system, according to one or more embodiments.
Figure 7B:
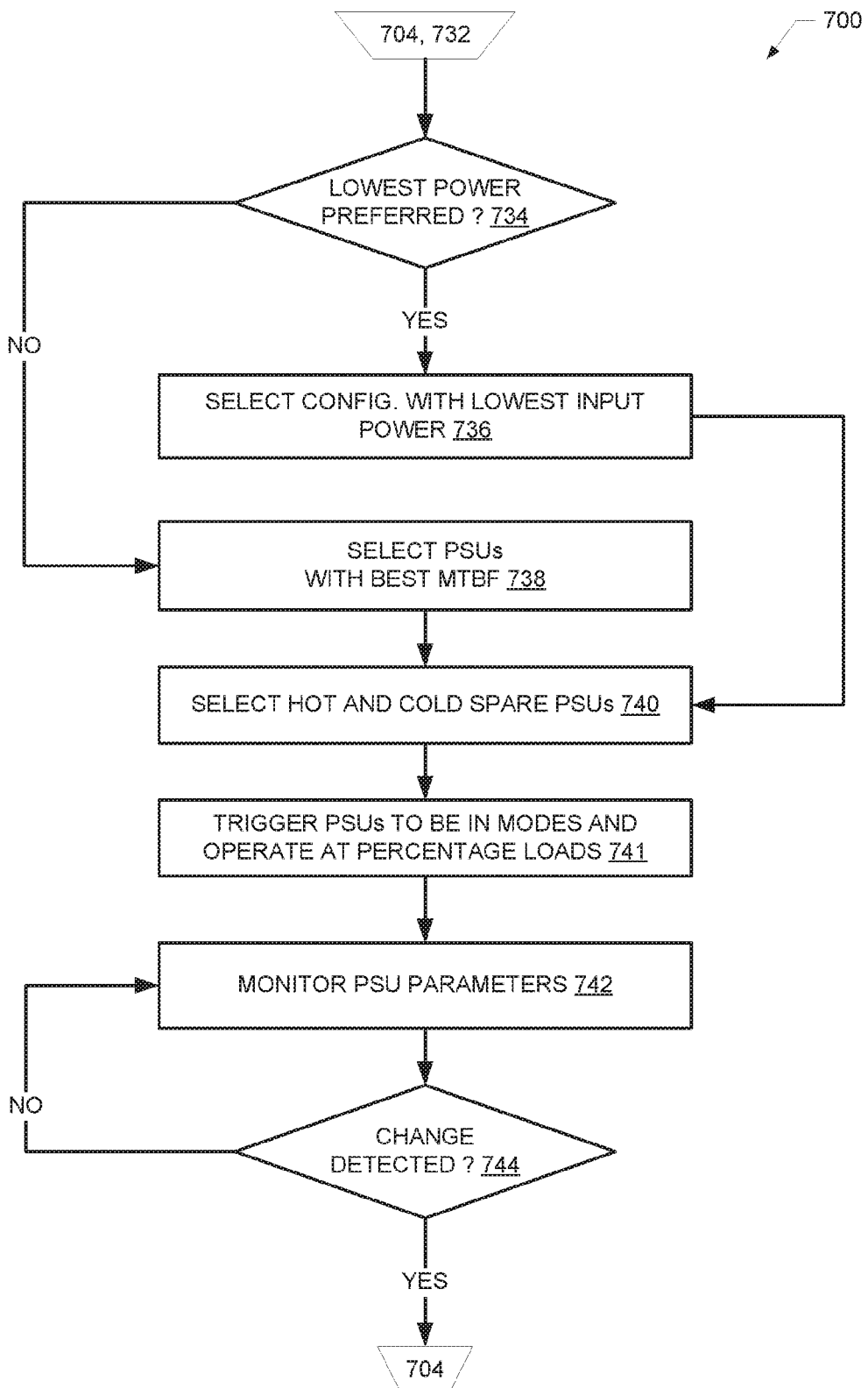

FIG. 7A-B illustrates details of method 700 to determine active and sleep mode PSUs on a real time basis within IHS 100. Method 700 is implemented within IHS 100 using PSUs 1 160A and 4 160D. However, method 700 can be implemented with more than two PSUs and up to hundreds of PSUs in an IHS. Method 700 begins at the start block and proceeds to block 702 where BMC 150 retrieves history table 494 from BMC memory 372.

At decision block 704, BMC 150 determines if history table 494 contains data for the current percentage of the power cap 491 (i.e. load) that the PSUs in IHS 100 (i.e. PSU 1 160A and PSU 4 160D) are currently operating at. In response to history table 494 not containing data for the current percentage of the power cap 491 that the PSUs are operating at, BMC 150 extrapolates a predictive configuration of PSUs that are in an active mode and PSUs that are in a sleep mode (block 706). In one embodiment, the extrapolation utilizes the table data for the two percentages that are above and below the detected current percentage of power cap. BMC 150 determines if the predicted PSU configuration is for both PSU 1 160A and PSU 4 160D to be active (decision block 708). In response to the predicted PSU configuration being that both PSU 1 160A and PSU 4 160D are to be active, BMC 150 triggers both of PSU 1 160A and PSU 4 160D to be active and operational (block 710). BMC 150 also determines if PSU 1 160A and PSU 4 160D have reached a thermal steady state (decision block 712). In response to PSU 1 160A and PSU 4 160D not being in thermal steady state, BMC 150 continues to determine if PSU 1 160A and PSU 4 160D have reached a thermal steady state at decision block 712. In response to PSU 1 160A and PSU 4 160D being in a thermal steady state, BMC 150 triggers PSU 1 160A and PSU 4 160D to measure and transmit each of their respective input power 412 and 472, output power 414 and 474, and temperatures 416, 418, 420, and 476, 478, 480 to BMC 150 (block 714).

After block 714 and in response to the predicted PSU configuration not being for both PSU 1 160A and PSU 4 160D to be active, BMC 150 determines if the predicted PSU configuration is for PSU 1 160A to be active and PSU 4 160D to be in a sleep mode (decision block 716). In response to the predicted PSU configuration being for PSU 1 160A to be active and PSU 4 160D to be in a sleep mode, BMC 150 triggers PSU 1 160A to be active and PSU 4 160D to be in a sleep mode (block 718), and BMC 150 determines if PSU 1 160A and PSU 4 160D have reached a thermal steady state (decision block 720). In response to PSU 1 160A and PSU 4 160D not being in thermal steady state, BMC 150 continues to determine if PSU 1 160A and PSU 4 160D have reached a thermal steady state at decision block 720. In response to PSU 1 160A and PSU 4 160D being in a thermal steady state, BMC 150 triggers PSU 1 160A and PSU 4 160D to measure and transmit each of their respective input power 412 and 472, output power 414 and 474, and temperatures 416, 418, 420, and 476, 478, 480 to BMC 150 (block 722).

After block 722 and in response to the predicted PSU configuration not being for PSU 1 160A to be active and PSU 4 160D to be in a sleep mode active, BMC 150 determines if the predicted PSU configuration is for PSU 1 160A to be in a sleep mode and PSU 4 160D to be in an active mode (decision block 724). In response to the predicted PSU configuration being for PSUs 1 160A to be in a sleep mode and PSU 4 160D to be active, BMC 150 triggers PSU 1 160A to be in a sleep mode and PSU 4 160D to be active (block 726), and BMC 150 determines if PSU 1 160A and PSU 4 160D have reached a thermal steady state (decision block 728). In response to PSU 1 160A and PSU 4 160D not being in thermal steady state, BMC 150 continues to determine if PSU 1 160A and PSU 4 160D have reached a thermal steady state at decision block 728. In response to PSU 1 160A and PSU 4 160D being in a thermal steady state, BMC 150 triggers PSU 1 160A and PSU 4 160D to measure and transmit each of their respective input power 412 and 472, output power 414 and 474, and temperatures 416, 418, 420, and 476, 478, 480 to BMC 150 (block 730).

BMC 150 stores the received input power 412 and 472, output power 414 and 474, and temperatures 416, 418, 420, and 476, 478, 480 to BMC memory 372 (block 732). After block 732 and in response to the predicted PSU configuration being for PSUs 1 160A to be in a sleep mode and PSU 4 160D to be active, BMC 150 determines if the lowest power configuration of PSUs 1 160A and PSU 4 160D is the preferred combination of PSUs (decision block 734). In one embodiment, the lowest power configuration is the combination of PSUs with the lowest combined input power 412 and 472 at a corresponding percentage load.

In response to the lowest power configuration of PSUs 1 160A and PSU 4 160D being preferred, BMC 150 selects the configuration of PSUs having the lowest power (block 736). In response to the lowest power configuration of PSUs 1 160A and PSU 4 160D not being preferred, BMC 150 selects the configuration of PSUs having the highest mean time between failure (MTBF) from MTBF list 404 (block 738). After blocks 736 and 738, BMC 150 selects at least one of the non-active PSUs (i.e. one of the sleep mode PSUs) to be hot and cold spare PSUs (block 740).

BMC 150 triggers the lowest power configuration of the PSUs to be in an active or sleep mode at their respective percentage loads (block 741). The lowest power configuration is the combination of PSUs with the lowest combined input power 412 and 472 at a corresponding percentage load. At block 742, BMC 150 monitors the PSU operating parameters by triggering the PSUs to measure and transmit each of their respective input powers, output powers, and temperatures during operation. BMC 150 determines if there has been a change in the values of the respective input powers, output powers, and temperatures for the PSUs (decision block 744). In response to determining there has not been a change in the values of the respective input powers, output powers, and temperatures for the PSUs, BMC 150 continues monitoring the PSU operating parameters at block 742. In response to determining there has been a change in the values of the respective input powers, output powers, and temperatures for the PSUs, BMC 150 returns to block 704 where BMC 150 again continues to determine if history table 494 contains data for the current percentage of the power cap 491 (i.e. percentage load) that the PSUs in IHS 100 are currently operating at.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for determining a power supply unit (PSU) configuration in an information handling system (IHS), the method comprising:
   determining, via a controller, a first amount of power required to operate functional components of the IHS, the first amount of power correlating to a present percentage load on a plurality of PSUs utilized to power the IHS;
   retrieving a history table containing a plurality of PSU configurations and PSU data, the PSU configurations comprising combinations of active mode and sleep mode PSUs for each of a plurality of percentage loads, wherein the history table is generated during a power on self test (POST) of the IHS prior to initiating processing operations;
   determining if the history table contains a first PSU configuration corresponding to the first amount of power required to operate the functional components of the IHS; and
   in response to determining that the history table contains the first PSU configuration, configuring the PSUs identified as active mode PSUs in the first PSU configuration to be in an active mode and collectively operating at the corresponding percentage load and configuring the PSUs identified as sleep mode PSUs in the first PSU configuration to be in a sleep mode.

2. The method of claim 1, wherein in response to determining that the history table does not contain the first PSU configuration, the method further comprises:
   extrapolating a predictive combination of active and sleep mode PSUs; and
   configuring the PSUs identified as active mode PSUs in the predictive combination to be in an active mode and triggering the PSUs identified in the predictive combination as sleep mode PSUs to be in a sleep mode.

3. The method of claim 1, wherein in response to determining that the history table does not contain the first PSU configuration, the method further comprises:
   triggering each of the plurality of PSUs to transmit respective PSU parameters associated with operation of the PSUs for the plurality of percentage loads;
   determining a second PSU configuration having a lowest total input power that supports the present percentage load; and
   triggering activation of the second configuration of PSUs.

4. The method of claim 1, wherein generating the history table further comprises:
   configuring the PSUs to be in a plurality of combinations of active and sleep modes;
   triggering each of the PSUs to transmit a plurality of PSU parameters associated with operation of the PSU at each of the plurality of percentage loads and for each of the plurality of combinations; and storing, as the plurality of PSU configurations, the PSU parameters for the plurality of percentage loads for each of the plurality of combinations.

5. The method of claim 1, further comprising:
receiving a plurality of power supply parameters for each of the PSUs;
calculating a power supply thermal efficiency score (PTES) based on the power supply parameters;
determining which of the PSUs have the highest PTES values; and
identifying the PSUs with the highest PTES values and capacity to support the first amount of power as the active mode PSUs and identifying the remaining PSUs as the sleep mode PSUs.

6. The method of claim 5, wherein calculating the PTES value further comprises:
calculating a plurality of PSU statistics for each of the PSUs at least partially based on the power supply parameters; and
assigning weights to each of the PSU statistics, wherein the PTES values are calculated based on the PSU statistics and the assigned weights.

7. A power supply system comprising:
a plurality of power supply units (PSUs) supplying power to an information handling system (IHS);
a controller communicatively coupled to the PSUs, the controller having firmware executing thereon to determine a PSU configuration to apply to the IHS, wherein the firmware configures the controller to:
determine a first amount of power required to operate functional components of the IHS, the first amount of power correlating to a present percentage load on a plurality of PSUs utilized to power the IHS;
retrieve a history table containing a plurality of PSU configurations and PSU data, the PSU configurations comprising combinations of active mode and sleep mode PSUs for each of a plurality of percentage loads, wherein the history table is generated during a power on self test (POST) of the IHS prior to initiating processing operations;
determine if the history table contains a first PSU configuration corresponding to the first amount of power required to operate the functional components of the IHS; and
in response to determining that the history table contains the first PSU configuration, configure the PSUs identified as active mode PSUs in the first PSU configuration to be in an active mode and collectively operating at the corresponding percentage load and configure trigger the PSUs identified as sleep mode PSUs in the first PSU configuration to be in a sleep mode.

8. The power supply system of claim 7, wherein in response to determining that the history table does not contain the first PSU configuration corresponding to the first amount of power required to operate functional components of the IHS, the controller:
extrapolates a predictive combination of active and sleep mode PSUs; and
configures the PSUs identified as active mode PSUs in the predictive combination to be in an active mode and configures the PSUs identified in the predictive combination as sleep mode PSUs to be in a sleep mode.

9. The power supply system of claim 7, wherein in response to determining that the history table does not contain the first PSU configuration corresponding to the first amount of power required to operate functional components of the IHS, the controller:
triggers each of the PSUs to transmit a plurality of PSU parameters associated with operation of the PSUs for the plurality of percentage loads;
determines a second PSU configuration having a lowest total input power that supports the present percentage load; and
triggers activation of the second configuration of PSUs.

10. The power supply system of claim 7, wherein to generate the history table the controller:
configures the PSUs to be in a plurality of combinations of active and sleep modes;
triggers each of the PSUs to transmit a plurality of PSU parameters associated with operation of the PSU at each of the plurality of percentage loads and for each of the plurality of combinations; and
stores the PSU parameters for the plurality of percentage loads for each of the plurality of combinations as the plurality of PSU configurations.

11. The power supply system of claim 7, wherein the firmware further configures the controller to:
receive a plurality of power supply parameters for each of the PSUs;
calculate a power supply thermal efficiency score (PTES) based on the power supply parameters;
determine which of the PSUs have the highest PTES values; and
identify the PSUs with the highest PTES values and capacity to support the first amount of power as the active mode PSUs and identifying the remaining PSUs as the sleep mode PSUs.

12. The power supply system of claim 11, wherein to calculate the PTES value, the controller:
calculates a plurality of PSU statistics for each of the PSUs at least partially based on the power supply parameters; and
assigns weights to each of the PSU statistics, wherein the PTES values are calculated based on the PSU statistics and the assigned weights.

13. An information handling system (IHS) comprising:
a processor;
a plurality of power supply units (PSUs) supplying power to the IHS;
a controller communicatively coupled to the PSUs, the controller having firmware executing thereon to determine a PSU configuration to apply to the IHS, wherein the firmware configures the controller to:
determine a first amount of power required to operate functional components of the IHS, the first amount of power correlating to a present percentage load on a plurality of PSUs utilized to power the IHS;
retrieve a history table containing a plurality of PSU configurations and PSU data, the PSU configurations comprising combinations of active mode and sleep mode PSUs for each of a plurality of percentage loads, wherein the history table is generated during a power on self test (POST) of the IHS prior to initiating processing operations;
determine if the history table contains a first PSU configuration corresponding to the first amount of power required to operate the functional components of the IHS; and
in response to determining that the history table contains the first PSU configuration, configure r the PSUs identified as active mode PSUs in the first PSU configuration to be in an active mode and collectively operating at the corresponding percentage load and configure the PSUs identified as sleep mode PSUs in the first PSU configuration to be in a sleep mode.

14. The information handling system of claim 13, wherein in response to determining that the history table does not contain the first PSU configuration corresponding to the first amount of power required to operate functional components of the IHS, the controller:

extrapolates a predictive combination of active and sleep mode PSUs; and triggers the PSUs identified as active mode PSUs in the predictive combination to be in an active mode and triggers the PSUs identified in the predictive combination as sleep mode PSUs to be in a sleep mode.

15. The information handling system of claim 13, wherein in response to determining that the history table does not contain the first PSU configuration corresponding to the first amount of power required to operate functional components of the IHS, the controller:

triggers each of the PSUs to transmit a plurality of PSU parameters associated with operation of the PSUs for the plurality of percentage loads;

determines a second PSU configuration having a lowest total input power that supports the present percentage load; and triggers activation of the second configuration of PSUs.

16. The information handling system of claim 13, wherein to generate the history table the controller:

configures the PSUs to be in a plurality of combinations of active and sleep modes;

triggers each of the PSUs to transmit a plurality of PSU parameters associated with operation of the PSU at each of the plurality of percentage loads and for each of the plurality of combinations; and stores the PSU parameters for the plurality of percentage loads for each of the plurality of combinations as the plurality of PSU configurations.

17. The information handling system of claim 13, wherein the firmware further configures the controller to:

receive a plurality of power supply parameters for each of the PSUs;

calculate a power supply thermal efficiency score (PTES) based on the power supply parameters;

determine which of the PSUs have the highest PTES values; and identify the PSUs with the highest PTES values and capacity to support the first amount of power as the active mode PSUs and identifying the remaining PSUs as the sleep mode PSUs.

18. The power supply system of claim 17, wherein to calculate the PTES value, the controller:

calculates a plurality of PSU statistics for each of the PSUs at least partially based on the power supply parameters; and assigns weights to each of the PSU statistics, wherein the PTES values are calculated based on the PSU statistics and the assigned weights.

* * * * *